United States Patent
Liu et al.

(10) Patent No.: US 11,233,549 B2
(45) Date of Patent: Jan. 25, 2022

(54) INFORMATION TRANSMISSION METHOD AND APPARATUS

(71) Applicant: HUAWEI TECHNOLOGIES CO., LTD., Guangdong (CN)

(72) Inventors: Xianda Liu, Beijing (CN); Kunpeng Liu, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 94 days.

(21) Appl. No.: 16/711,645

(22) Filed: Dec. 12, 2019

(65) Prior Publication Data

US 2020/0119783 A1    Apr. 16, 2020

Related U.S. Application Data

(63) Continuation of application No. PCT/CN2018/089665, filed on Jun. 1, 2018.

(30) Foreign Application Priority Data

Jun. 16, 2017 (CN) .................. 201710463305.X

(51) Int. Cl.
*H04B 7/0456* (2017.01)
*H04L 5/00* (2006.01)
(Continued)

(52) U.S. Cl.
CPC ......... *H04B 7/0456* (2013.01); *H04L 5/0051* (2013.01); *H04W 72/0453* (2013.01); *H04W 72/1268* (2013.01)

(58) Field of Classification Search
CPC ... H04B 7/0456; H04B 7/0482; H04L 5/0051; H04L 5/001; H04L 5/0053; H04L 5/0057;
(Continued)

(56) References Cited

U.S. PATENT DOCUMENTS

2011/0110455 A1    5/2011   Gaal et al.
2012/0082102 A1*   4/2012   Kang .................. H04B 7/0639
                                                  370/329
(Continued)

FOREIGN PATENT DOCUMENTS

CN    102187726 A    9/2011
CN    102237958 A    11/2011
(Continued)

OTHER PUBLICATIONS

Interdigital Inc: "TPMI Indication for Frequency Selective UL Precoding",3GPP Draft; R1-1708331,May 6, 2017 (May 6, 2017), XP051262371,total 4 pages.
(Continued)

*Primary Examiner* — Thai Nguyen
(74) *Attorney, Agent, or Firm* — Womble Bond Dickinson (US) LLP

(57) ABSTRACT

A terminal device may receive precoding indicator information, where the precoding indicator information includes K first indicators and one second indicator. The terminal device determines K first precoding matrices based on the K first indicators, and determines a second precoding matrix based on the second indicator, where K is a positive integer. The terminal device precodes, by using the K first precoding matrices, data sent in K first frequency bands, to obtain precoded first data, and precodes, by using the second precoding matrix, data sent in a second frequency band, to obtain precoded second data. The K first frequency bands are located in some frequency bands in a physical uplink shared channel (PUSCH) scheduling frequency band. The second frequency band is a frequency band in the PUSCH scheduling frequency band other than the K first frequency bands.

20 Claims, 6 Drawing Sheets

(51) Int. Cl.
*H04W 72/04* (2009.01)
*H04W 72/12* (2009.01)

(58) Field of Classification Search
CPC ............... H04L 5/0048; H04L 5/0094; H04W 72/0453; H04W 72/1268; H04W 72/04; H04W 72/0413; H04W 72/1284
See application file for complete search history.

(56) References Cited

U.S. PATENT DOCUMENTS

| | | | |
|---|---|---|---|
| 2012/0108278 A1 | 5/2012 | Kim et al. | |
| 2013/0128813 A1 | 5/2013 | Yang et al. | |
| 2014/0092850 A1* | 4/2014 | Ko | H04W 72/042 370/329 |
| 2015/0372732 A1 | 12/2015 | Kim et al. | |
| 2016/0329942 A1 | 11/2016 | Zhu et al. | |
| 2020/0213053 A1* | 7/2020 | Faxer | H04L 5/0023 |

FOREIGN PATENT DOCUMENTS

| | | |
|---|---|---|
| CN | 102271031 A | 12/2011 |
| CN | 102415041 A | 4/2012 |
| CN | 102845097 A | 12/2012 |
| CN | 102946262 A | 2/2013 |
| CN | 106031110 A | 10/2016 |

OTHER PUBLICATIONS

Huawei: "Performances of CQI feedback schemes on PUSCH",3GPP Draft; R1-074232,Oct. 2, 2007 (Oct. 2, 2007),XP050107758,total 4 pages.

NTT DOCOMO et al.: "Investtgation on PMI Indication Schemes for Single-User MIMO Precoding in E-UTRA Downltnk",3GPP Draft; R1-075057,Nov. 13, 2007 (Nov. 13, 2007),XP050108497,total 6 pages.

* cited by examiner

INFORMATION TRANSMISSION METHOD AND APPARATUS

CROSS-REFERENCE TO RELATED APPLICATION

This application is continuation application of International Application No. PCT/CN2018/089665, filed on Jun. 1, 2018, which claims the priority of Chinese Application No. 201710463305.X, filed on Jun. 16, 2017. The disclosures of the aforementioned applications are hereby incorporated by reference in their entireties.

TECHNICAL FIELD

The present disclosure relates to the field of communications technologies, and in particular, to an information transmission method and apparatus.

BACKGROUND

Currently, in a communications system, uplink or downlink data needs to be transmitted based on channel estimation information obtained by receiving and measuring a reference signal. For example, during uplink data transmission, a base station configures, for a terminal by using higher layer signaling, a related parameter (for example, a time-frequency resource position and a quantity of ports for sending an SRS) for sending the sounding reference signal (SRS); the terminal sends the SRS to the base station based on the related parameter of the SRS; and the base station obtains channel estimation information by receiving and measuring the SRS, to determine channel state information (CSI) used for uplink data transmission. The CSI includes a rank indicator (RI), a precoding matrix indicator (PMI), and a channel quality indicator (CQI). Therefore, the base station may notify the terminal of the CSI, so that the terminal can send uplink data by using the CSI.

A manner of notifying a precoding matrix during uplink data transmission is dividing an entire system bandwidth into a plurality of subbands, and successively notifying, by using a plurality of precoding matrix indicators, precoding matrices used for sending data in the subbands. When the system bandwidth is relatively large, signaling overheads used for notifying a precoding matrix are relatively high.

SUMMARY

Embodiments of the present disclosure provide a data transmission method and apparatus. A part of bandwidth included in a system bandwidth used for sending data is divided into a plurality of frequency bands, and precoding matrices used for sending data in different frequency bands are notified by using different precoding indicator information. A bandwidth other than the part of bandwidth is used as a frequency band to notify the precoding indicator information. This reduces signaling overheads used for notifying a precoding matrix.

According to a first aspect, an embodiment of the present disclosure provides a data transmission method. In the data transmission method, a terminal device may receive precoding indicator information, and the precoding indicator information includes K first indicators and a second indicator. The terminal device may determine K first precoding matrices based on the K first indicators, and determine a second precoding matrix based on the second indicator, where K is a positive integer. The terminal device precodes, by using the K first precoding matrices, data sent in K first frequency bands, to obtain precoded first data, and precodes, by using the second precoding matrix, data sent in a second frequency band, to obtain precoded second data. The terminal device may send the precoded first data in the K first frequency bands, and the terminal device may send the precoded second data in the second frequency band. The K first frequency bands are located in some frequency bands in a physical uplink shared channel (PUSCH) scheduling frequency band, and the second frequency band is a frequency band in the PUSCH scheduling frequency band other than the K first frequency bands. A bandwidth occupied by each of the K first frequency bands is less than a bandwidth occupied by the second frequency band.

Compared with an implementation in which precoding matrices of all frequency bands in each scheduling frequency band are indicated, in this implementation, precoding matrices of the K first frequency bands and the second frequency band can be simultaneously indicated, so that a precoding matrix can be better selected while signaling overheads are reduced. This increases a signal-to-noise ratio for sending data and improves frequency selective scheduling performance.

In one embodiment, the second indicator may be a rank indicator, and a network device may instruct, in a predefined manner or in a higher layer signaling notification manner, the terminal to determine, based on a rank of the rank indicator and a precoding matrix previously used by the terminal to send a reference signal resource in the second frequency band, a precoding matrix for sending a PUSCH in the second frequency band. A base station may determine, by receiving and measuring the reference signal resource that is not precoded and that is sent by the terminal, a rank used for transmitting the PUSCH; and notify, by using the rank indicator, the terminal of the rank for transmitting the PUSCH.

For example, when sending N precoded reference signal resources, the terminal simultaneously sends a reference signal resource that is not precoded; the base station may obtain uplink channel information by receiving and measuring the reference signal resource that is not precoded, so as to determine a rank for transmitting the PUSCH and indicate the rank to the terminal; and the terminal may determine the precoding matrix in the second frequency band based only on the rank. For example, assuming that the precoded reference signal resource sent in the second frequency band includes four ports, and assuming that a rank 3 included in the precoding indicator information is used to transmit the PUSCH, a precoding matrix used by a port 0, a port 1, and a port 2 included in the reference signal resource may be used as the precoding matrix in the second frequency band. A port selection rule needs to be predefined. For example, selection is performed in ascending order of port numbers.

In one embodiment, each of the K first indicators may include M reference signal resource indicators, and M is a positive integer. That the terminal device determines K first precoding matrices based on the K first indicators may include: For the M reference signal resource indicators included in each first indicator, the terminal device may determine M reference signal resources indicated by the M reference signal resource indicators, and the terminal device may determine one first precoding matrix based on the M reference signal resources. The M reference signal resources are M reference signal resources in N reference signal resources sent before the terminal device receives the precoding indicator information, and N is a positive integer greater than or equal to M. In this implementation, the M reference signal resource indicators may be used to determine a first precoding matrix in one first frequency band, and no other signaling needs to be additionally introduced. This can reduce signaling overheads.

For example, the N reference signal resources sent by the terminal device include one reference signal resource that is not precoded and (N-1) precoded reference signal resources, and each precoded reference signal resource includes one port. If the base station determines, based on the reference signal resource that is not precoded, that the rank 3 is used to transmit the PUSCH, the base station may select three reference signal resources from the (N-1) precoded reference signal resources, and use reference signal resource indicators SRIs of the three reference signal resources as the first indicator. The terminal may determine the three reference signal resources based on the three SRIs included in the first indicator; then determine a first precoding matrix by using a precoding matrix used on the three reference signal resources; and use the first precoding matrix as the precoding matrix corresponding to the first frequency band.

In another embodiment, each of the K first indicators may include one precoding matrix indicator, and that the terminal device determines K first precoding matrices based on the K first indicators includes: For the precoding matrix indicator included in each first indicator, the terminal device may determine a first precoding matrix based on a correspondence between a precoding matrix indicator and a precoding matrix. In other words, the terminal device may determine, based on an index value indicated by the precoding matrix indicator, a precoding matrix in an uplink codebook configured by the base station, and use the precoding matrix as a first precoding matrix used for sending data in one first frequency band in the PUSCH scheduling frequency band. According to this embodiment, only some frequency bands in the PUSCH scheduling frequency band correspond to the first indicators. This reduces overheads for notifying a precoding matrix in a frequency band by using signaling.

Correspondingly, in one embodiment, the second indicator may include M reference signal resource indicators, and the M reference signal resource indicators included in the second indicator may be different from the M reference signal resource indicators included in the first indicator. That the terminal device determines a second precoding matrix based on the second indicator includes: The terminal device determines M reference signal resources indicated by the M reference signal resource indicators; and the terminal device determines the second precoding matrix based on the M reference signal resources. The M reference signal resources are M reference signal resources in N reference signal resources sent before the terminal device receives the precoding indicator information, and N is a positive integer greater than or equal to M. In this implementation, the reference signal resources indicated by the M reference signal resource indicators may be different from the reference signal resources indicated by the M reference signal resource indicators included in the first indicator. According to this embodiment, the second frequency band corresponds to only one second indicator. This reduces overheads for notifying, by using signaling, a precoding matrix used for sending data on each frequency band.

Correspondingly, in another embodiment, the second indicator is one precoding matrix indicator, and that the terminal device determines a second precoding matrix based on the second indicator includes: The terminal device determines the second precoding matrix based on a correspondence between the precoding matrix indicator and a precoding matrix.

In one embodiment, in the data transmission method, positions of the K first frequency bands in the PUSCH scheduling frequency band may be determined in a predefined manner or in a higher layer signaling notification manner. For example, a quantity m of RBs included in each frequency band, a quantity K of first frequency bands, and a number of each of the K first frequency bands are predefined in the terminal device, or are notified by the base station to the terminal device by using higher layer signaling. The m RBs are scheduled RBs or contiguous RBs in the PUSCH scheduling frequency band. The terminal device obtains a bandwidth of the PUSCH scheduling frequency band by using resource indication information, and determines the number of each frequency band according to a preset rule based on the quantity m of RBs included in each frequency band. For example, frequency band numbers are sorted in descending order of frequencies, and then the positions of the K first frequency bands in the scheduling frequency band are determined based on the predefined number of each frequency band. The base station may notify the positions of the K first frequency bands in the PUSCH scheduling frequency band by indicating a field including $\log_2 C_m^k$ bits in the higher layer signaling. It can be understood that, in this embodiment of the present disclosure, a quantity of bits used to indicate the positions of the K first frequency bands in the PUSCH scheduling frequency band is obtained through rounding up based on a calculation result. For example, rounding up is performed based on $\log_2 C_m^k$, which is represented as $\lceil \log_2 C_m^k \rceil$. A field including $\lceil \log_2 C_m^k \rceil$ bits is used to represent the positions of the K first frequency bands in the PUSCH scheduling frequency band. For example, the base station may indicate, by using the higher layer signaling, that the PUSCH scheduling bandwidth is divided into m subbands with a size of the first frequency band, and the PUSCH includes the K first frequency bands. The K first frequency bands correspond to K pieces of precoding matrix indicator information in DCI, and m>K. The base station further notifies the positions of the K first frequency bands in the scheduling bandwidth by indicating the field including the $\lceil \log_2 C_m^k \rceil$ bits in the higher layer signaling. A quantity of RBs included in each first frequency band is determined based on a total quantity L of RBs occupied by the PUSCH. In other words, each first frequency band includes L/m RBs.

For example, m is two RBs, K is 2, and two numbers are #0 and #1. When the terminal device learns, based on resource scheduling indication information, that the scheduling frequency band is 10 contiguous RBs in a specific frequency range, the terminal device may further learn that two first frequency bands each include four RBs at highest frequency positions. In this case, the terminal device determines positions of the first frequency bands. In this way, this can furthest reduce overheads for notifying a precoding matrix in a frequency band by using signaling.

In one embodiment, position indication information of the K first frequency bands is dynamically indicated by the base station. In other words, the precoding indicator information further includes the position indication information of the K first frequency bands. The terminal device determines the positions of the K first frequency bands in the PUSCH scheduling frequency band based on the position indication information. The terminal may determine a size of each frequency band in the scheduling frequency band based on a quantity of bits used by a position indication information field, the value of K, and a size of the scheduling frequency band. In this case, the size of the frequency band is the same as a size of the first frequency band. The terminal further determines a frequency domain range on which the K first indicators act. The quantity of bits used by the position indication information field and the value of K need to be predefined in the terminal device, or are notified by the base station to the terminal device by using the higher layer signaling. The position indication information is determined based on the size of the PUSCH scheduling frequency band and a size of the position indication information field. In this case, the quantity of RBs included in each first frequency band is related to the value of K and the size of the scheduling frequency band. It is assumed that a quantity of bits required by the position indication information is set to $\lceil \log_2 C_P^K \rceil$, and P is determined based on the quantity of bits used in the position indication information field and the value of K, where the quantity of bits and the value of K are predefined in the terminal device or are notified by the base station to the terminal device by using the higher layer signaling. In other words, the size of the frequency band dynamically changes based on the size of the scheduling bandwidth determined by using the resource scheduling indication information.

The positions of the K first frequency bands in the PUSCH scheduling frequency band include K contiguous frequency bands starting from a lowest frequency position in the PUSCH scheduling frequency band, and K contiguous frequency bands starting from a highest frequency position in the PUSCH scheduling frequency band. In one embodiment, the positions of the K first frequency bands in the PUSCH scheduling frequency band may further include K odd-numbered frequency bands in the PUSCH scheduling frequency band, and K even-numbered frequency bands in the PUSCH scheduling frequency band. The position indication information of the K first frequency bands is used to indicate either of the foregoing cases. In this way, overheads for notifying a precoding matrix in a frequency band by using signaling can be furthest reduced while a precoding matrix is better selected. A precoding matrix that is determined by the terminal for uplink data transmission may not be an optimal precoding matrix because the terminal cannot obtain information about interference to the base station. The base station may notify only information about a part of bandwidth that is most seriously interfered with, to optimize the precoding matrix that is determined by the terminal for uplink data transmission. In addition, it is determined, for a remaining part of bandwidth by using one piece of indication signaling, that a precoding matrix selected by the terminal is the precoding matrix used for uplink data transmission.

According to a second aspect, an embodiment of the present disclosure further provides a data transmission method. In the data transmission method, a network device may send precoding indicator information. The precoding indicator information includes K first indicators, the K first indicators are used to indicate K first precoding matrices, and K is a positive integer. The precoding indicator information further includes one second indicator, and the second indicator is used to indicate a second precoding matrix. The network device receives first data obtained after precoding is performed on K first frequency bands and second data obtained after precoding is performed on a second frequency band. A precoding matrix used for the first data is the K first precoding matrices. The K first frequency bands are located in some frequency bands in a physical uplink shared channel (PUSCH) scheduling frequency band. A precoding matrix used for the second data is the second precoding matrix. The second frequency band is a frequency band in the PUSCH scheduling frequency band other than the K first frequency bands. A bandwidth occupied by each of the K first frequency bands is less than a bandwidth occupied by the second frequency band. It can be learned that, in this implementation, a base station notifies, by using the K first frequency bands and the second frequency band, a precoding matrix used for the PUSCH scheduling frequency band. Compared with a case of successively notifying precoding matrices of all frequency bands in the scheduling frequency band currently, this can reduce signaling overheads used for notifying a precoding matrix.

In one embodiment, the second indicator may be a rank indicator, and the network device may instruct, in a predefined manner or in a higher layer signaling notification manner, a terminal to determine a precoding matrix in the second frequency band based on a rank indicated by the rank indicator and a precoding matrix previously used by the terminal to send a reference signal resource in the second frequency band. The base station needs to determine, by receiving and measuring a reference signal resource that is not precoded, a rank for transmitting a PUSCH.

In one embodiment, each of the K first indicators includes M reference signal resource indicators, and M is a positive integer. The M reference signal resource indicators included in each first indicator are used to indicate M reference signal resources. The M reference signal resources are M reference signal resources in N reference signal resources received before the network device sends the precoding indicator information, and N is a positive integer greater than or equal to M. In this implementation, the first indicator notified by the network device includes the M reference signal resource indicators, so that the terminal can determine a first precoding matrix of one first frequency band by using the M reference signal resource indicators, and no other signaling needs to be additionally introduced. This can reduce signaling overheads.

In one embodiment, each of the K first indicators includes one precoding matrix indicator, and each first indicator includes one precoding matrix. In this notification manner, one first precoding matrix indicator may be determined by using one precoding matrix indicator, so that signaling overheads can be further reduced.

Correspondingly, in one embodiment, the second indicator includes M reference signal resource indicators. The M reference signal resource indicators included in the second indicator may be different from the M reference signal resource indicators included in the first indicator. The M reference signal resource indicators included in the second indicator are used to indicate M reference signal resources. The M reference signal resources are M reference signal resources in N reference signal resources received before the network device sends the precoding indicator information, and N is a positive integer greater than or equal to M.

In one embodiment, the second indicator is one precoding matrix indicator, and the precoding matrix indicator is used to indicate the second precoding matrix.

In one embodiment, positions of the K first frequency bands in the PUSCH scheduling frequency band may be determined in a predefined manner or in a higher layer signaling notification manner.

In one embodiment, the precoding indicator information further includes position indication information of the K first frequency bands, and the position indication information is used to indicate the positions of the K first frequency bands in the PUSCH scheduling frequency band. For example, the positions that are of the K first frequency bands in the PUSCH scheduling frequency band and that are predefined by the network device may include K contiguous frequency bands starting from a lowest frequency position in the PUSCH scheduling frequency band, and K contiguous frequency bands starting from a highest frequency position in the PUSCH scheduling frequency band. The terminal device may select one group of the foregoing two groups of positions as the positions of the K first frequency bands in the PUSCH scheduling frequency band based on the position indication information.

For example, a quantity m of RBs included in each frequency band, a quantity K of first frequency bands, and a number of each of the K first frequency bands are predefined in the terminal device, or are notified by the base station to the terminal device by using higher layer signaling. The m RBs are scheduled RBs or contiguous RBs in the PUSCH scheduling frequency band. The terminal device obtains a bandwidth of the PUSCH scheduling frequency band by using resource indication information, and determines the number of each frequency band according to a preset rule based on the quantity m of RBs included in each frequency band. For example, frequency band numbers are sorted in descending order of frequencies, and then the positions of the K first frequency bands in the scheduling frequency band are determined based on the predefined number of each frequency band. The base station may notify the positions of the K first frequency bands in the PUSCH scheduling frequency band by indicating a field including $\lceil \log\_2\ K \rceil$ bits in the higher layer signaling. For example, m is two RBs, K is 2, and two numbers are #0 and #1. When the terminal device learns, based on resource scheduling indication information, that the scheduling frequency band is 10 contiguous RBs in a specific frequency range, the terminal device may further learn that two first frequency bands each include four RBs at highest frequency positions. In this case, the terminal device determines positions of the first frequency bands. In this way, this can furthest reduce overheads for notifying a precoding matrix in a frequency band by using signaling. It can be understood that, in this embodiment of the present disclosure, a quantity of bits used to indicate the positions of the K first frequency bands in the PUSCH scheduling frequency band is obtained through rounding up based on a calculation result of $\log_2 C_m^k$. For example, rounding up is performed based on $\log_2 C_m^k$, which is represented as $\lceil \log_2 C_m^k \rceil$. A field including $\lceil \log_2 C_m^k \rceil$ bits is used to represent the positions of the K first frequency bands in the PUSCH scheduling frequency band. For example, the base station may indicate, by using the higher layer signaling, that the PUSCH scheduling bandwidth is divided into m subbands with a size of the first frequency band, and the PUSCH includes the K first frequency bands. The K first frequency bands correspond to K pieces of precoding matrix indicator information in DCI, and m>K. The base station further notifies the positions of the K first frequency bands in the scheduling bandwidth by indicating the field including the $\lceil \log_2 C_m^K \rceil$ bits in the higher layer signaling. A quantity of RBs included in each first frequency band is determined based on a total quantity L of RBs occupied by the PUSCH. In other words, each first frequency band includes L/m RBs.

The positions of the K first frequency bands in the PUSCH scheduling frequency band include K contiguous frequency bands starting from a lowest frequency position in the PUSCH scheduling frequency band, or K contiguous frequency bands starting from a highest frequency position in the PUSCH scheduling frequency band.

According to a third aspect, an embodiment of the present disclosure further provides a data transmission apparatus. The data transmission apparatus has functions of implementing the data transmission method according to the first aspect or the second aspect. The functions may be implemented by hardware, or may be implemented by hardware by implementing corresponding software. The hardware or the software includes one or more units corresponding to the foregoing functions. For example, the data transmission apparatus may include a receiving unit, a determining unit, a precoding unit, and a sending unit, or the data transmission apparatus may include a sending unit and a receiving unit.

According to a fourth aspect, an embodiment of the present disclosure further provides a terminal device. The terminal device may include a processor, a memory, a transmitter, and a receiver. The memory stores an instruction, and when the instruction is executed by the processor, the terminal device is enabled to perform the data transmission method according to the first aspect. The terminal device receives precoding indicator information by using the receiver, and sends a precoded first data in the K first frequency bands and a precoded second data in the second frequency band by using the transmitter.

According to a fifth aspect, an embodiment of the present disclosure further provides a network device. The network device includes a processor, a memory, a transmitter, and a receiver. The memory stores an instruction, and when the instruction is executed by the processor, the network device is enabled to perform the data transmission method according to the second aspect. The network device sends precoding indicator information by using the transmitter, and receives, by using the receiver, precoded first data sent in K first frequency bands and precoded second data sent in a second frequency band.

According to a sixth aspect, an embodiment of the present disclosure further provides a computer readable storage medium. The computer readable storage medium stores an instruction. When the instruction runs on a computer, the data transmission method according to the first aspect can be performed.

According to a seventh aspect, an embodiment of the present disclosure further provides a computer program product. When an instruction in the computer program product is executed by a processor, the data transmission method provided in the second aspect can be implemented.

According to an eighth aspect, an embodiment of the present disclosure further provides a computer program product. When an instruction in the computer program product is executed by a processor, the data transmission method provided in the second aspect can be implemented.

According to a ninth aspect, an embodiment of the present disclosure further provides a data transmission system. The data transmission system includes a terminal device and a network device. The terminal device is configured to perform the data transmission method according to the first aspect, and the network device is configured to perform the data transmission method according to the second aspect.

According to a tenth aspect, an embodiment of the present disclosure provides a chip system. The chip system includes a processor, configured to support a terminal device in implementing the functions in the first aspect, for example, processing data and/or information in the foregoing method. In a possible design, the chip system further includes a memory. The memory is configured to store a program instruction and data that are suitable for the terminal device. The chip system may include a chip, or may include a chip and another discrete component. In another possible design, the chip system may further include a receiver and a transmitter, so as to interact with another device.

DESCRIPTION OF EMBODIMENTS

Figure 1:
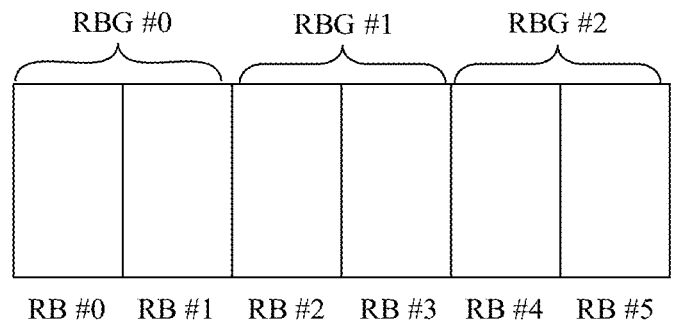
FIG. 1 is a schematic diagram of a scheduling frequency band according to an embodiment of the present disclosure.

The embodiments of the present disclosure are described below with reference to the accompanying drawings in the embodiments of the present disclosure.

It should be understood that the technical solutions of the present disclosure may be specifically applied to various communications systems, for example, a global system for mobile communications (GSM), code division multiple access (CDMA), wideband code division multiple access (WCDMA), time division-synchronous code division multiple access (TD-SCDMA), universal mobile telecommunications system (UMTS), and a long term evolution (LTE) system. With continuous development of communications technologies, the technical solutions of the present disclosure may be further applied to a future network, for example, a fifth-generation mobile communications technology (5G) system that may also be referred to as a new radio (NR) system, an end-to-end (device to device, D2D) system, or a machine-to-machine (M2M) system.

For example, communication in the embodiments of the present disclosure may be communication between a base station and a terminal; or may be communication between base stations, for example, communication between a macro base station and a micro base station; or may be communication between terminals, for example, communication in a D2D network. In the embodiments of the present disclosure, communication between a base station and user equipment is used as an example. The user equipment may be a wireless terminal or a wired terminal. The wireless terminal may be a device that provides a user with voice and/or data connectivity, a handheld device having a wireless connection function, or another processing device connected to a wireless modem. The wireless terminal may communicate with one or more core networks by using a radio access network (RAN). For example, the user equipment may be a mobile terminal, for example, a mobile phone (or referred to as a "cellular" phone) or a computer having a mobile terminal; or may be a portable, pocket-sized, handheld, computer built-in, or vehicle-mounted mobile apparatus, for example, a personal communications service (PCS) phone, a cordless telephone set, a session initiation protocol (SIP) phone, a wireless local loop (WLL) station, or a personal digital assistant (PDA). The user equipment exchanges voice and/or data with the radio access network. In one embodiment, the user equipment may also be referred to as a mobile console (Mobile Station, MS), a mobile terminal, a subscriber unit (SU), a subscriber station (SS), a mobile station (MS), a remote station (RS), an access point (AP), a remote terminal (RT), an access terminal (AT), a user terminal (UT), a user agent (UA), a terminal device (User Device, UD), or the like. This is not limited in the present disclosure.

In the present disclosure, a network device may include a base station, a transmission reception point (TRP), or a radio frequency unit such as a remote radio unit (RRU). The base station may be a device that communicates with a terminal by using one or more sectors on an air interface in an access network, and may coordinate attribute management of the air interface. For example, the base station may be a base station in GSM or CDMA, for example, a base transceiver station (BTS); or may be a base station in WCDMA, for example, a NodeB; or may be an evolved NodeB in LTE, for example, an eNB or e-NodeB (evolutional Node B); or may be a gNB in 5G system, a base station in a future network, or the like. This is not limited in the present disclosure. In one embodiment, the base station may be a relay device, or another network element device having a base station function.

During uplink data transmission, the base station needs to perform channel estimation by receiving and measuring a reference signal, to determine precoding indicator information used for uplink data transmission. The reference signal used by the base station to determine uplink channel quality includes a sounding reference signal (SRS). A time-frequency resource used by the terminal to send the reference signal is determined based on a related configuration parameter of a reference signal resource.

The related configuration parameter of the reference signal resource may include parameters shown in Table 1. In one embodiment, the reference signal resource may further include another configuration parameter, for example, a quantity of ports of the reference signal resource. In one embodiment, these configuration parameters of the reference signal resource may be configured by the base station for the terminal by using higher layer signaling.

TABLE 1

| SRS parameter name | Meaning | Signaling type |
| --- | --- | --- |
| srs-BandwidthConfig | Maximum SRS bandwidth in a cell | Cell-specific |
| srs-SubframeConfig | Subframe group that may be used for sending an SRS in a cell | Cell-specific |

TABLE 1-continued

| SRS parameter name | Meaning | Signaling type |
|---|---|---|
| srs-Bandwidth | SRS bandwidth of UE | UE-specific |
| freqDomainPosition | Frequency domain position | UE-specific |
| srs-HoppingBandwidth | Frequency jump size | UE-specific |
| Duration | Single SRS/Periodic SRS | UE-specific |
| srs-ConfigIndex | Period and subframe offset | UE-specific |
| transmissionComb | Transmission comb compensation | UE-specific |
| cyclicShift | Cyclic shift | UE-specific |

For example, in an uplink transmission mechanism, the terminal sends a reference signal resource based on the reference signal resource configured by the base station and a related configuration parameter of the reference signal resource, and the base station may perform channel estimation by receiving and measuring the reference signal resource, so that the base station can allocate a specific frequency domain resource to the terminal for uplink data transmission, and indicate the allocated frequency domain resource to the terminal by using downlink control information (DCI). The terminal sends uplink data based on the frequency domain resource indicated in the DCI.

The DCI is control information that is used by the base station to indicate user equipment (UE) behavior at a physical layer. In addition, the higher layer signaling may also be used by the base station to indicate the control information of the UE behavior, and the higher layer signaling is indication information that is at a layer higher than the physical layer and that is used to control and manage related UE, for example, radio resource control (RRC) signaling. Generally, a manner of notifying a precoding matrix during uplink data transmission is dividing an entire system bandwidth into a plurality of frequency bands, and successively notifying, by using a plurality of precoding matrix indicators, precoding matrices used for sending data in the frequency bands. When a scheduling frequency band is relatively large, signaling overheads used for notifying a precoding matrix are relatively high.

The frequency domain resource allocated by the base station is some or all frequency domain resources in the system bandwidth. The frequency domain resource allocated by the base station may also be referred to as a physical uplink shared channel (PUSCH) scheduling frequency band. The base station may allocate the frequency domain resource at a granularity of a resource block group (RBG). The RBG includes a resource block set of N contiguous resource blocks (RB). In other words, the system bandwidth is divided into N parts each with an RBG size in frequency domain. The base station may determine, by using a scheduling algorithm of the base station, whether each part in frequency domain is allocated to the terminal, and address the RBG by using a bitmap. Each bit in the bitmap correspondingly indicates whether an RBG is allocated to the terminal (for example, FIG. 1 is a schematic diagram of a scheduling frequency band according to an embodiment of the present disclosure. As shown in FIG. 1, assuming that the system bandwidth is six RBs, frequency domain resources are divided into three RBGs (each RBG includes two RBs). In this case, the bitmap includes three bits, and each bit indicates whether one RBG is scheduled. For example, when the bitmap is 001, an RBG #2 is scheduled; or when the bitmap is 111, an RBG #0, an RBG #1, and the RBG #2 are scheduled. Further, scheduling information is notified to the terminal by indicating the bitmap. Correspondingly, the scheduling frequency band includes all allocated RBGs indicated in the scheduling information.

A precoding resource block group (PRG) includes at least one contiguous RB, and a fixed precoding matrix is used for each RB included in the PRG. In other words, a precoding matrix in a frequency band corresponding to the PRG does not change with a frequency, and the scheduling frequency band carrying uplink data may include a plurality of RBGs or PRGs. A quantity of RBGs or a quantity of PRGs into which the system bandwidth is divided may be predefined by a system or notified by a higher layer. The scheduling frequency band may include a plurality of PRGs, and different precoding information may be used for different PRGs. For selective scheduling in frequency domain, the base station needs to determine a precoding matrix used in each PRG. An amount of precoding information depends on a quantity of PRGs. Consequently, signaling overheads are excessively high.

The embodiments of the present disclosure provide a data transmission method and apparatus, so as to reduce signaling overheads required by a base station to notify precoding information.

In the embodiments of the present disclosure, a terminal may determine a scheduling frequency band in a system bandwidth based on scheduling information delivered by the base station. The scheduling bandwidth is a frequency domain range between a scheduled resource block at a highest frequency position and a scheduled resource block at a lowest frequency position that are determined in the system bandwidth based on the scheduling information. The scheduling frequency band may be divided into L parts in frequency domain, and a size of each part in frequency domain may be referred to as one frequency band. The terminal may determine, in a system-predefined manner or by using information indicated by higher layer signaling, a quantity of RBs included in one frequency band. The RBs included in the frequency band use a same precoding matrix. In the embodiments of the present disclosure, one frequency band is one of the L parts in frequency domain into which the scheduling frequency band is divided, where L is a positive integer. Each first frequency band may correspond to one frequency band in the PUSCH scheduling frequency band, and a second frequency band may include a plurality of frequency bands. In this case, a bandwidth of the second frequency band is greater than a bandwidth of the first frequency band.

Figure 2:
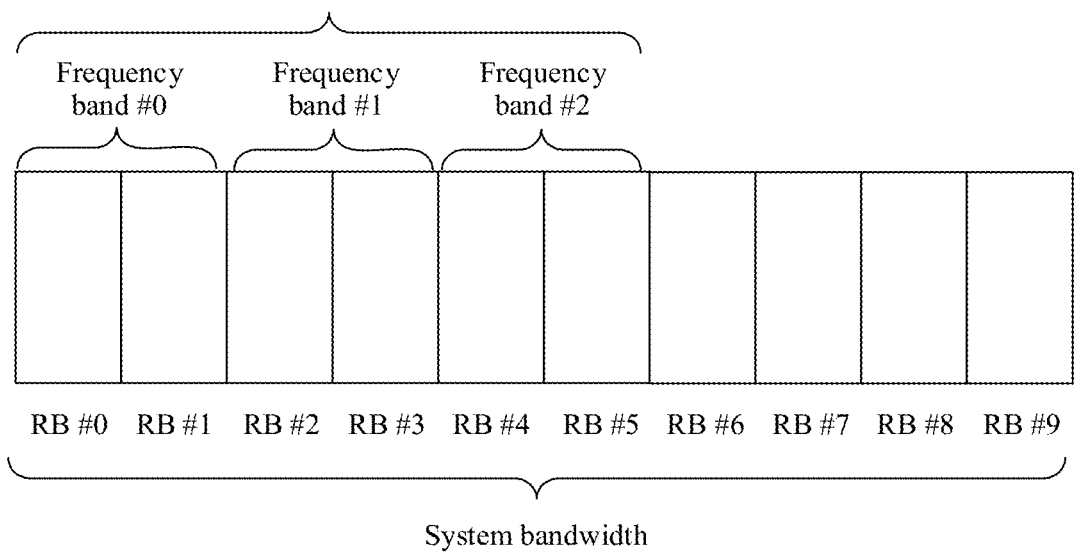
FIG. 2 is a schematic diagram of another scheduling frequency band according to an embodiment of the present disclosure.

For example, FIG. 2 is a schematic diagram of another scheduling frequency band according to an embodiment of the present disclosure. As shown in FIG. 2, assuming that a system bandwidth includes 10 RBs, a terminal may determine, based on scheduling information delivered by a base station, that a PUSCH scheduling frequency band is the first six RBs. Assuming that one frequency band includes two RBs, the scheduling frequency band may include three frequency bands. Assuming that precoding indicator information includes two first indicators and one second indicator, and positions of two first frequency bands are predefined as the first two frequency bands in the scheduling frequency band, the two first frequency bands are respectively a frequency band #0 and a frequency band #1, and a second frequency band is a frequency band #2.

In one embodiment, the scheduling bandwidth is all scheduled resource blocks determined in the system bandwidth based on the scheduling information. The scheduling frequency band may be divided into L resource block sets, where L is a positive integer. Each resource block set includes different resource blocks. Each resource block set may be referred to as a frequency band. The terminal may determine, in a system-predefined manner or by using information indicated by higher layer signaling, a quantity of resource blocks included in one frequency band. A same precoding matrix is used for data sent on the resource blocks included in the frequency band. Each first frequency band is one of L frequency bands in the PUSCH scheduling frequency band. The second frequency band may include a plurality of frequency bands. A bandwidth of the second frequency band is greater than a bandwidth of the first frequency band. In the data transmission method, the base station may notify the terminal device of precoding information of some frequency bands, and does not dynamically notify a frequency band in the scheduling frequency band other than the some frequency bands. In other words, when uplink data transmission is performed on the frequency band other than the some frequency bands, precoding information used by the terminal to send reference signal resources on these frequency bands is still used. It can be learned that only precoding information of some frequency bands is dynamically indicated in this implementation. Compared with an implementation of dynamically indicating precoding information of all frequency bands, this helps reduce signaling overheads.

Figure 3:
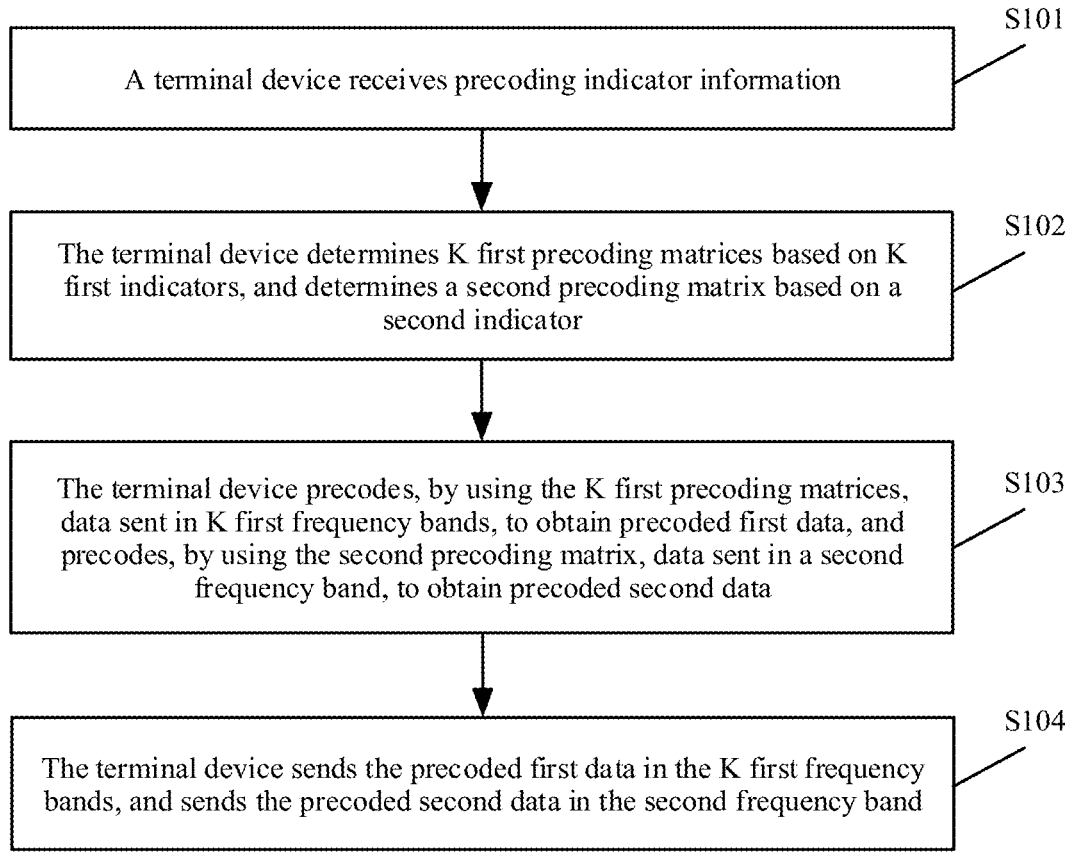
FIG. 3 is a schematic flowchart of a data transmission method according to an embodiment of the present disclosure.

FIG. 3 is a schematic flowchart of a data transmission method according to an embodiment of the present disclosure. As shown in FIG. 3, the data transmission method may include the following operations.

Operation S101. A terminal device receives precoding indicator information.

The precoding indicator information includes K first indicators and one second indicator.

Operation S102. The terminal device determines K first precoding matrices based on the K first indicators, and determines a second precoding matrix based on the second indicator.

Herein, K is a positive integer.

Operation S103. The terminal device precodes, by using the K first precoding matrices, data sent in K first frequency bands, to obtain precoded first data, and precodes, by using the second precoding matrix, data sent in a second frequency band, to obtain precoded second data.

Operation S104. The terminal device sends the precoded first data in the K first frequency bands, and sends the precoded second data in the second frequency band.

The K first frequency bands are located in some frequency bands in a physical uplink shared channel (PUSCH) scheduling frequency band. In other words, the K first frequency bands are some frequency bands in the PUSCH scheduling frequency band. One first frequency band may include one frequency band, and a same precoding matrix is used for data sent on each RB in the first frequency band. The second frequency band is a frequency band in the PUSCH scheduling frequency band other than the K first frequency bands. A bandwidth occupied by each of the K first frequency bands is less than a bandwidth occupied by the second frequency band.

It can be learned that, in the data transmission method, signaling only needs to indicate, by using the K first indicators, that precoding matrices corresponding to the K first frequency bands are notified. Therefore, compared with a case in which signaling indicates a precoding matrix of each PRG in the PUSCH scheduling frequency band, this can reduce signaling overheads.

In an embodiment, positions of the K first frequency bands in the PUSCH scheduling frequency band may be determined in a predefined manner or in a higher layer signaling notification manner.

In another embodiment, positions of the K first frequency bands are dynamically indicated by a base station. In other words, the precoding indicator information further includes position indication information of the K first frequency bands. The position indication information is used to indicate the positions of the K first frequency bands in the PUSCH scheduling frequency band.

For example, a quantity m of RBs included in each frequency band, a quantity K of first frequency bands, and a number of each of the K first frequency bands are predefined in the terminal device, or are notified by the base station to the terminal device by using higher layer signaling. The m RBs are scheduled RBs or contiguous RBs in the PUSCH scheduling frequency band. The terminal device obtains a bandwidth of the PUSCH scheduling frequency band by using resource indication information, and determines the number of each frequency band according to a preset rule based on the quantity m of RBs included in each frequency band. For example, frequency band numbers are sorted in descending order of frequencies, and then the positions of the K first frequency bands in the scheduling frequency band are determined based on the predefined number of each frequency band. The base station may notify the positions of the K first frequency bands in the PUSCH scheduling frequency band by indicating a field including $\lceil \log\_2 K \rceil$ bits in the higher layer signaling. For example, m is, K is 2, and two numbers are #0 and #1. When the terminal device learns, based on resource scheduling indication information, that the scheduling frequency band is 10 contiguous RBs in a specific frequency range, the terminal device may further learn that two first frequency bands each include four RBs at highest frequency positions. In this case, the terminal device determines positions of the first frequency bands. In this way, this can furthest reduce overheads for notifying a precoding matrix in a frequency band by using signaling. It can be understood that, in this embodiment of the present disclosure, the base station may notify the positions of the K first frequency bands in the PUSCH scheduling frequency band by indicating a field including $\lceil \log_2 C_m^k \rceil$ bits in the higher layer signaling. In other words, a quantity of bits used to indicate the positions of the K first frequency bands in the PUSCH scheduling frequency band is obtained through rounding up based on a calculation result of $\log_2 C_m^k$. For example, the base station may indicate, by using the higher layer signaling, that the PUSCH scheduling bandwidth is divided into m subbands with a size of the first frequency band, and the PUSCH includes the K first frequency bands. The K first frequency bands correspond to K pieces of precoding matrix indicator information in DCI, and m>K. The base station further notifies the positions of the K first frequency bands in the scheduling bandwidth by indicating the field including the $\lceil \log_2 C_m^K \rceil$ bits in the higher layer signaling. A quantity of RBs included in each first frequency band is determined based on a total quantity L of RBs occupied by the PUSCH. In other words, each first frequency band includes L/m RBs.

Figure 4:
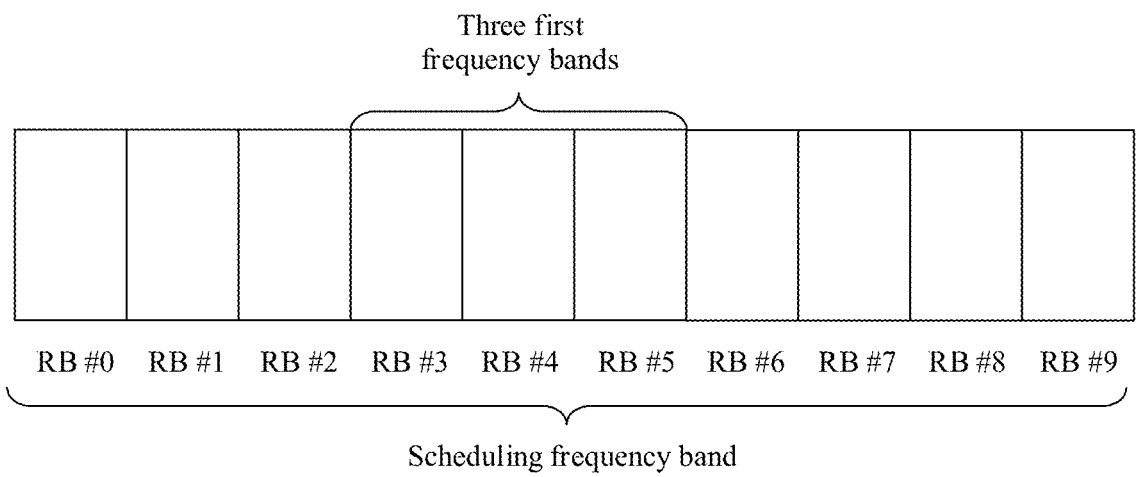
FIG. 4 is a schematic diagram of a scheduling frequency band according to an embodiment of the present disclosure.

For example, FIG. 4 is a schematic diagram of a scheduling frequency band according to an embodiment of the present disclosure. As shown in FIG. 4, the scheduling frequency band includes 10 RBs, and each frequency band may include one RB. It is assumed that a system respectively predefines a frequency band #3, a frequency band #4, and a frequency band #5 as first frequency bands (in other words, an RB #2, an RB #3, and an RB #4 are respectively the first frequency bands), and remaining RBs are second frequency bands. In other words, the terminal may determine, by using the foregoing information and the scheduling information, that the K first frequency bands are respectively a third RB to a fifth RB in the scheduling frequency band. According to the data transmission method in FIG. 1, precoding matrices used by the terminal to send data on the third RB to the fifth RB are respectively three first precoding matrices indicated by three first indicators.

The precoding indicator information further needs to include position information of the three first frequency bands. Because the scheduling frequency band includes the 10 RBs, the position information may indicate the position information of the three first frequency bands by using $\log_2^{10}$ bits. It can be understood that the position information may also indicate the position information of the three first frequency bands by using $\lceil \log_2 10 \rceil$ bits. In other words, the four bits are used to indicate the position information of the three first frequency bands. For example, 0010 indicates that a first frequency band to which a precoding matrix indicated by the $1^{st}$ first indicator in the three first indicators is applicable is the third RB; 0011 indicates that a first frequency band to which a precoding matrix indicated by the $2^{nd}$ first indicator in the three first indicators is applicable is the fourth RB; and 0100 indicates that a first frequency band to which a precoding matrix indicated by the $3^{rd}$ first indicator in the three first indicators is applicable is the fifth RB.

In one embodiment, the positions of the K first frequency bands in the PUSCH scheduling frequency band are K RBs corresponding to the K first frequency bands, and in addition, optional positions of the K first frequency bands in the PUSCH scheduling frequency band may be further broadly predefined. In one embodiment, that the positions of the K first frequency bands in the PUSCH scheduling frequency band are notified to the terminal in the two optional manners of predefining positions and determining positions by the terminal based on higher layer signaling includes the following: K contiguous frequency bands starting from a lowest frequency position in the PUSCH scheduling frequency band are used as the K first frequency bands, and K contiguous frequency bands starting from a highest frequency position in the PUSCH scheduling frequency band are used as the K first frequency bands. The terminal device may determine one group in the two groups of positions as the positions of the K first frequency bands in the PUSCH scheduling frequency band based on the position indication information.

Figure 5:
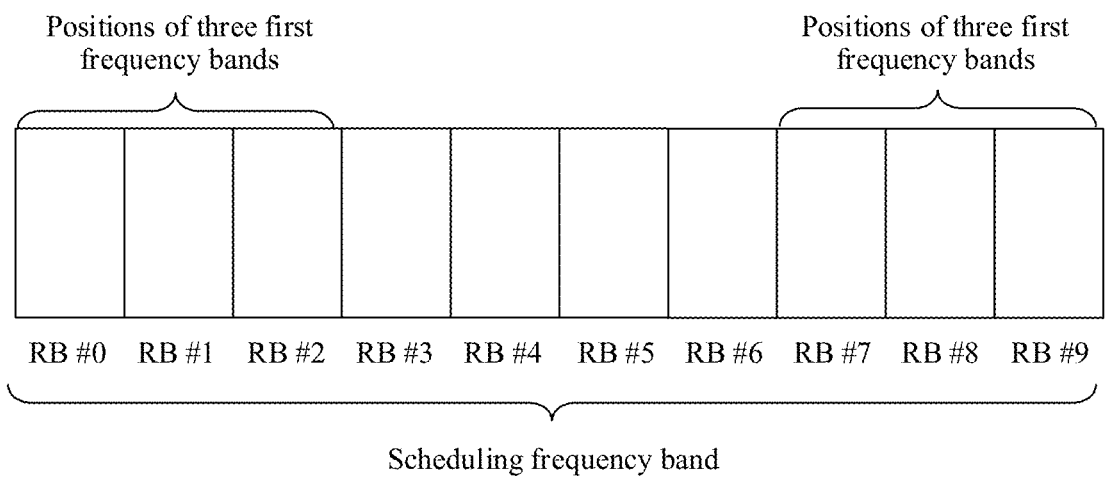
FIG. 5 is a schematic diagram of positions of three first frequency bands according to an embodiment of the present disclosure.

For example, FIG. 5 is a schematic diagram of positions of three first frequency bands according to an embodiment of the present disclosure. The three first frequency bands may be the first three RBs sorted in ascending order of frequencies in the PUSCH scheduling frequency band, or may be the first three RBs sorted in descending order of frequencies in the PUSCH scheduling frequency band. When the position indication information is 1, the first three RBs sorted in ascending order of frequencies in the PUSCH scheduling frequency band are selected as the three first frequency bands. When the position indication information is 0, the first three frequency bands in descending order of frequencies in the PUSCH scheduling frequency band are selected as the three first frequency bands.

The base station dynamically notifies precoding matrices used in the K first frequency bands; and further needs to notify, by using the second indicator, a precoding matrix used in a frequency band in the scheduling frequency band other than the K first frequency bands, in other words, notify the second precoding matrix.

In one embodiment, the second indicator may be a rank indicator. In other words, the base station may notify the terminal device of precoding information (the precoding matrices indicated by the K first indicators) of some frequency bands (for example, the K first frequency bands); and does not dynamically notify a frequency band in the scheduling frequency band other than the some frequency bands (in this embodiment of the present disclosure, frequency bands in the PUSCH scheduling frequency band other than the K first frequency bands all are referred to as the second frequency band). In other words, when the second indicator is the rank indicator, a system may instruct, in a predefined manner or a higher layer signaling notification manner, the terminal to determine, based on the rank indicator and a precoding matrix used by the terminal to send a reference signal resource in the second frequency band, a precoding matrix used for sending a PUSCH in the second frequency band.

In this implementation, in addition to sending a plurality of precoded reference information resources, the terminal further needs to send one reference signal resource that is not precoded, so that the base station can determine a rank of the PUSCH based on the reference signal resource that is not precoded, and notify the terminal by using the rank indicator RI. Further, the terminal may determine, by using the rank and the precoding information that is used when the terminal sends the precoded reference signal resource in the second frequency band, the precoding matrix used for sending the PUSCH in the second frequency band.

The terminal may send a reference signal by using a frequency selective precoding method or a non-frequency selective precoding method (in other words, a wideband precoding method).

Specifically, the terminal device may determine the precoding matrix in the second frequency band by using the following operations: The terminal obtains a reference signal resource sent by the terminal in the second frequency band; the terminal obtains the rank that is used for sending the PUSCH and that is determined by the base station; the terminal determines a precoding matrix corresponding to the reference signal resource; and the terminal determines, based on the precoding matrix and the rank, the precoding matrix used for sending the PUSCH in the second frequency band. The rank of the PUSCH is a maximum quantity of data streams that the base station can schedule the terminal to send.

For example, it is assumed that the reference signal resource includes four ports, and each port may correspondingly use one precoding matrix (in other words, one column vector in precoding matrices of the reference signal resource). In this case, assuming that the base station determines that the rank of the PUSCH is a rank 3, when the terminal sends the reference signal resource in the second frequency band, precoding matrices used by a port 0, a port 1, and a port 2 are precoding matrices that are determined by the terminal for sending the PUSCH in the second frequency band.

In one embodiment, each of the K first indicators may include M reference signal resource indicators, and M is a positive integer. Correspondingly, in operation S102, that the terminal device determines K first precoding matrices based on the K first indicators may include:

for the M reference signal resource indicators included in each first indicator, determining, by the terminal device, M reference signal resources indicated by the M reference signal resource indicators, and determining one first precoding matrix based on the M reference signal resources.

The M reference signal resources are M reference signal resources in N reference signal resources sent before the terminal device receives the precoding indicator information.

In one embodiment, the determining, by the terminal device, one first precoding matrix based on the M reference signal resources may include: determining, by the terminal device, M precoding matrices used when the terminal device sends the M reference signal resources; and determining, by the terminal device, the first precoding matrix based on the M precoding matrices.

For example, one port is configured in each of the M reference signal resources, and the precoding matrices used when the terminal sends the M reference signal resources are respectively shown as follows:

$$\frac{1}{\sqrt{2}}\begin{bmatrix}1\\1\end{bmatrix}, \frac{1}{\sqrt{2}}\begin{bmatrix}1\\-1\end{bmatrix}, \ldots, \text{and } \frac{1}{\sqrt{2}}\begin{bmatrix}1\\j\end{bmatrix}.$$

In this case, the first precoding matrix determined based on the M precoding matrices may be a matrix obtained by combining the foregoing column vectors.

In another embodiment, the determining, by the terminal device, one first precoding matrix based on the M reference signal resources may include: aggregating the M reference signal resources into one reference signal resource. A precoding matrix corresponding to the reference signal resource is the first precoding matrix. This aggregation rule is not limited in this embodiment of the present disclosure.

In another embodiment, each of the K first indicators includes one precoding matrix indicator.

That the terminal device determines K first precoding matrices based on the K first indicators includes:

for the precoding matrix indicator included in each first indicator, determining, by the terminal device, one first precoding matrix based on a correspondence between the precoding matrix indicator and a precoding matrix.

The determining, by the terminal device, one first precoding matrix based on a correspondence between the precoding matrix indicator and a precoding matrix may be that the terminal device selects, from an uplink codebook based on an index value indicated by the precoding matrix indicator, a precoding matrix corresponding to the index value.

Correspondingly, in one embodiment, the second indicator includes M reference signal resource indicators, and the M reference signal resource indicators included in the second indicator may be different from the M reference signal resource indicators included in the first indicator. That the terminal device determines a second precoding matrix based on the second indicator includes: determining, by the terminal device, M reference signal resources indicated by the M reference signal resource indicators; and determining, by the terminal device, the second precoding matrix based on the M reference signal resources. The M reference signal resources are M reference signal resources in N reference signal resources sent before the terminal device receives the precoding indicator information.

In another embodiment, the second indicator is one precoding matrix indicator, and that the terminal device determines a second precoding matrix based on the second indicator includes: determining, by the terminal device, the second precoding matrix based on a correspondence between the precoding matrix indicator and a precoding matrix.

Figure 6:
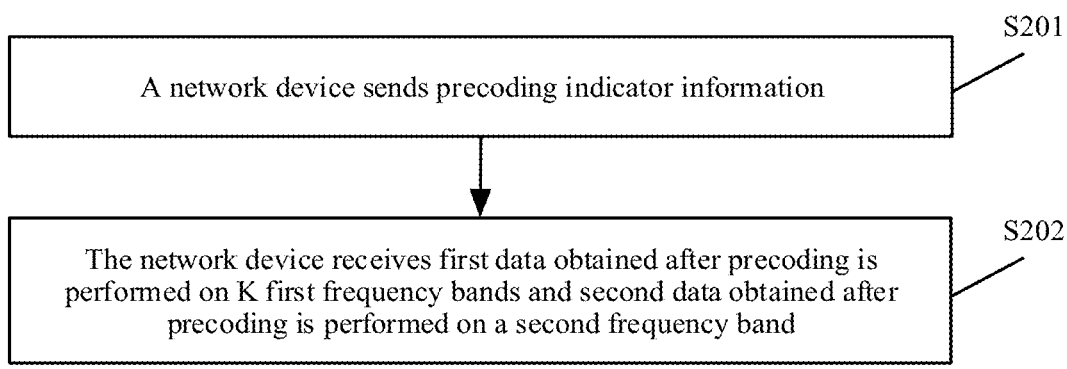
FIG. 6 is a schematic flowchart of another data transmission method according to an embodiment of the present disclosure.

FIG. 6 is a schematic flowchart of another data transmission method according to an embodiment of the present disclosure. As shown in FIG. 6, the data transmission method is described from a perspective of a network device. Specifically, the data transmission method shown in FIG. 6 may include the following operations.

Operation S201. The network device sends precoding indicator information.

The precoding indicator information includes K first indicators, the K first indicators are used to indicate K first precoding matrices, the precoding indicator information further includes a second indicator, the second indicator is used to indicate a second precoding matrix, and K is a positive integer.

Operation S202. The network device receives first data obtained after precoding is performed on K first frequency bands and second data obtained after precoding is performed on a second frequency band.

A precoding matrix used for the first data is the K first precoding matrices. The K first frequency bands are located in some frequency bands in a physical uplink shared channel (PUSCH) scheduling frequency band. A precoding matrix used for the second data is the second precoding matrix. The second frequency band is a frequency band in the PUSCH scheduling frequency band other than the K first frequency bands. A bandwidth occupied by each of the K first frequency bands is less than a bandwidth occupied by the second frequency band.

It can be learned that, in this implementation, a base station may notify precoding matrices of the K first frequency bands and the second frequency band in the PUSCH scheduling frequency band, and does not need to successively notify precoding matrices of all frequency bands in the scheduling frequency band. Therefore, this reduces signaling overheads used for notifying a precoding matrix.

In one embodiment, the second indicator in the second frequency band may be a rank indicator, and the network device may instruct, in a predefined manner or in a higher layer signaling notification manner, a terminal to determine the second precoding matrix based on a precoding matrix previously used by the terminal to send a reference signal resource in the second frequency band and a rank indicated by the rank indicator.

In one embodiment, each of the K first indicators includes M reference signal resource indicators, and M is a positive integer. The M reference signal resource indicators included in each first indicator are used to indicate M reference signal resources. The M reference signal resources are M reference signal resources in N reference signal resources received before the network device sends the precoding indicator information, and N is a positive integer greater than or equal to M. In this implementation, the first indicator notified by the network device includes the M reference signal resource indicators, so that the terminal can determine a first precoding matrix in one first frequency band by using the M reference signal resource indicators, and no other signaling needs to be additionally introduced. This can reduce signaling overheads.

In one embodiment, each of the K first indicators includes one precoding matrix indicator, and each first indicator includes one precoding matrix. In this notification manner, one first precoding matrix indicator may be determined by using one precoding matrix indicator, so that signaling overheads can be further reduced.

In one embodiment, the second indicator includes M reference signal resource indicators. The M reference signal resource indicators included in the second indicator may be different from the M reference signal resource indicators included in the first indicator. The M reference signal resource indicators included in the second indicator are used to indicate M reference signal resources. The M reference signal resources are M reference signal resources in N reference signal resources received before the network device sends the precoding indicator information, and N is a positive integer greater than or equal to M.

In one embodiment, the second indicator is one precoding matrix indicator, and the precoding matrix indicator is used to indicate the second precoding matrix.

Positions of the K first frequency bands in the PUSCH scheduling frequency band may be determined in a predefined manner or in a higher layer signaling notification manner.

In one embodiment, the precoding indicator information further includes position indication information of the K first frequency bands, and the position indication information is used to indicate the positions of the K first frequency bands in the PUSCH scheduling frequency band.

The positions of the K first frequency bands in the PUSCH scheduling frequency band include K contiguous frequency bands starting from a lowest frequency position in the PUSCH scheduling frequency band, and K contiguous frequency bands starting from a highest frequency position in the PUSCH scheduling frequency band. One position is determined based on the position indication information. In one embodiment, the positions of the K first frequency bands in the PUSCH scheduling frequency band may further include K odd-numbered frequency bands in the PUSCH scheduling frequency band, and K even-numbered frequency bands in the PUSCH scheduling frequency band. The position indication information of the K first frequency bands is used to indicate either of the foregoing cases. In this way, overheads for notifying a precoding matrix in a frequency band by using signaling can be furthest reduced while a precoding matrix is better selected.

A precoding matrix that is determined by the terminal for uplink data transmission may not be an optimal precoding matrix because the terminal cannot obtain information about interference to the base station. The base station may notify only information about a part of bandwidth that is most seriously interfered with, to optimize the precoding matrix that is determined by the terminal for uplink data transmission. In addition, it is determined, for a remaining part of bandwidth by using one piece of indication signaling, that a precoding matrix selected by the terminal is the precoding matrix used for uplink data transmission.

Figure 7:
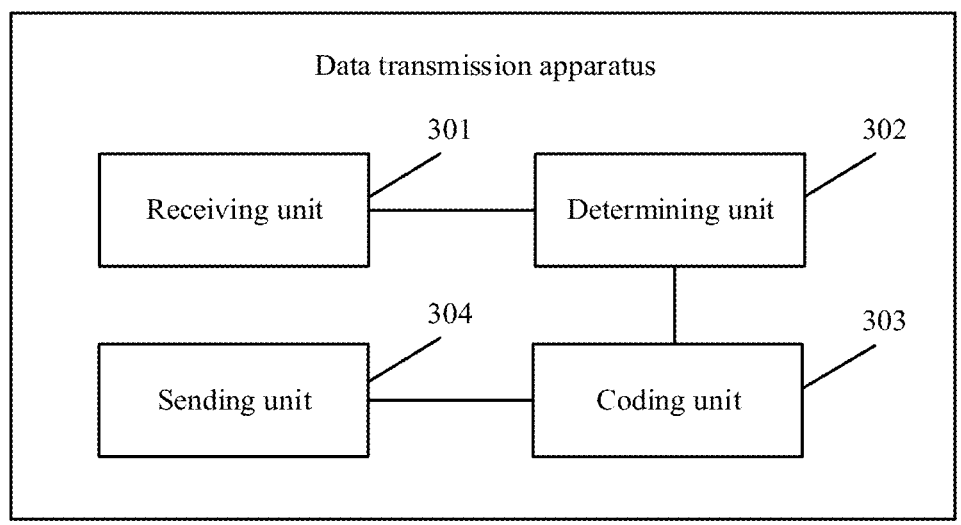
FIG. 7 is a schematic structural diagram of a data transmission apparatus according to an embodiment of the present disclosure.

FIG. 7 is a schematic structural diagram of a data transmission apparatus according to an embodiment of the present disclosure. The data transmission apparatus may perform the data transmission method corresponding to FIG. 3. Specifically, the data transmission apparatus may include a receiving unit 301, a determining unit 302, a coding unit 303, and a sending unit 304.

The receiving unit 301 is configured to receive precoding indicator information, where the precoding indicator information includes K first indicators and one second indicator;

The determining unit 302 is configured to: determine K first precoding matrices based on the K first indicators; and determine a second precoding matrix based on the second indicator, where K is a positive integer; and The coding unit 303 is configured to: precode, by using the K first precoding matrices, data sent in K first frequency bands, to obtain precoded first data; and precode, by using the second precoding matrix, data sent in a second frequency band, to obtain precoded second data.

The K first frequency bands are located in some frequency bands in a physical uplink shared channel (PUSCH) scheduling frequency band, the second frequency band is a frequency band in the PUSCH scheduling frequency band other than the K first frequency bands, and a bandwidth occupied by each of the K first frequency bands is less than a bandwidth occupied by the second frequency band.

The sending unit 304 is configured to: send the precoded first data in the K first frequency bands, and send the precoded second data in the second frequency band.

In one embodiment, each of the K first indicators includes M reference signal resource indicators, and M is a positive integer.

Further, in one embodiment, that the determining unit 302 is specifically configured to: for the M reference signal resource indicators included in each first indicator, determining M reference signal resources indicated by the M reference signal resource indicators, and determining one first precoding matrix based on the M reference signal resources.

The M reference signal resources are M reference signal resources in N reference signal resources sent before a terminal device receives the precoding indicator information, and N is a positive integer greater than or equal to M.

In one embodiment, each of the K first indicators includes one precoding matrix indicator.

Further, in one embodiment, that the determining unit 302 is specifically configured to: for the precoding matrix indicator included in each first indicator, determine one first precoding matrix based on a correspondence between the precoding matrix indicator and a precoding matrix.

In one embodiment, the second indicator includes M reference signal resource indicators, and the M reference signal resource indicators included in the second indicator may be different from the M reference signal resource indicators included in the first indicator.

Further, in one embodiment, that the determining unit 302 is specifically configured to: determining M reference signal resources indicated by the M reference signal resource indicators, and determining the second precoding matrix based on the M reference signal resources.

The M reference signal resources are M reference signal resources in N reference signal resources sent before the terminal device receives the precoding indicator information, and N is a positive integer greater than or equal to M.

In one embodiment, the second indicator is one precoding matrix indicator.

Further, in one embodiment, that the determining unit 302 is specifically configured to: determining the second precoding matrix based on a correspondence between the precoding matrix indicator and a precoding matrix.

In one embodiment, the precoding indicator information further includes position indication information of the K first frequency bands. The terminal device determines positions of the K first frequency bands in the PUSCH scheduling frequency band based on the position indication information.

In one embodiment, the positions of the K first frequency bands in the PUSCH scheduling frequency band include K contiguous frequency bands starting from a lowest frequency position in the PUSCH scheduling frequency band, or K contiguous frequency bands starting from a highest frequency position in the PUSCH scheduling frequency band.

Figure 8:
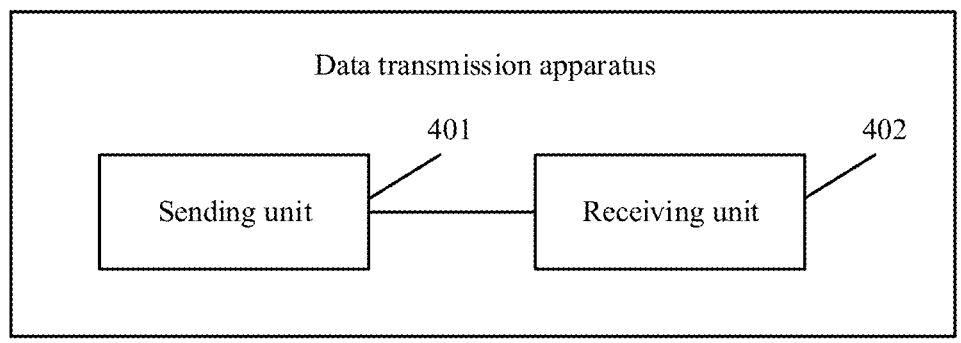
FIG. 8 is a schematic structural diagram of another data transmission apparatus according to an embodiment of the present disclosure.

FIG. 8 is a schematic structural diagram of a data transmission apparatus according to an embodiment of the present disclosure. The data transmission apparatus may perform the data transmission method corresponding to FIG. 6. Specifically, the data transmission apparatus may include the following units:

a sending unit 401, configured to send precoding indicator information, where the precoding indicator information includes K first indicators and one second indicator, the K first indicators are used to indicate K first precoding matrices, K is a positive integer, and the second indicator is used to indicate a second precoding matrix; and a receiving unit 402, configured to: receive first data obtained after precoding is performed on K first frequency bands, and receive second data obtained after precoding is performed on a second frequency band.

A precoding matrix used for the first data is the K first precoding matrices, and a precoding matrix used for the second data is the second precoding matrix.

The K first frequency bands are located in some frequency bands in a physical uplink shared channel (PUSCH) scheduling frequency band, the second frequency band is a frequency band in the PUSCH scheduling frequency band other than the K first frequency bands, and a bandwidth occupied by each of the K first frequency bands is less than a bandwidth occupied by the second frequency band.

In one embodiment, each of the K first indicators includes M reference signal resource indicators, and M is a positive integer. The M reference signal resource indicators included in each first indicator are used to indicate M reference signal resources. The M reference signal resources are M reference signal resources in N reference signal resources received before a network device sends the precoding indicator information, and N is a positive integer greater than or equal to M.

In one embodiment, each of the K first indicators includes one precoding matrix indicator, and the precoding matrix indicator included in each first indicator is used to indicate one first precoding matrix.

In one embodiment, the second indicator includes M reference signal resource indicators. The M reference signal resource indicators included in the second indicator may be different from the M reference signal resource indicators included in the first indicator. The M reference signal resource indicators included in the second indicator are used to indicate M reference signal resources. The M reference signal resources are M reference signal resources in N reference signal resources received before the network device sends the precoding indicator information, and N is a positive integer greater than or equal to M.

In one embodiment, the second indicator is one precoding matrix indicator, and the precoding matrix indicator is used to indicate the second precoding matrix.

In one embodiment, the precoding indicator information further includes position indication information of the K first frequency bands, and the position indication information is used to indicate positions of the K first frequency bands in the PUSCH scheduling frequency band.

In one embodiment, the positions that are of the K first frequency bands in the PUSCH scheduling frequency band and that are determined based on the position indication information may be K contiguous frequency bands starting from a lowest frequency position in the PUSCH scheduling frequency band, or K contiguous frequency bands starting from a highest frequency position in the PUSCH scheduling frequency band.

In this way, overheads for notifying a precoding matrix in a frequency band by using signaling can be furthest reduced while a precoding matrix is better selected. A precoding matrix that is determined by the terminal for uplink data transmission may not be an optimal precoding matrix because the terminal cannot obtain information about interference to the base station. The base station may notify only information about a part of bandwidth that is most seriously interfered with, to optimize the precoding matrix that is determined by the terminal for uplink data transmission. In addition, it is determined, for a remaining part of bandwidth by using one piece of indication signaling, that a precoding matrix selected by the terminal is the precoding matrix used for uplink data transmission.

Figure 9:
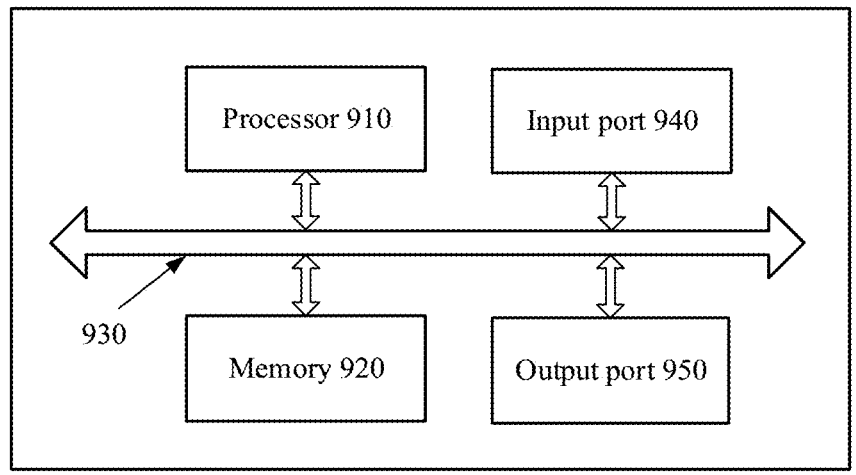
FIG. 9 is a schematic structural diagram of a device according to an embodiment of the present disclosure.

According to the foregoing method, FIG. 9 is a schematic structural diagram of a device according to an embodiment of the present disclosure. As shown in FIG. 9, the device may be user equipment, or may be a chip or a circuit, for example, a chip or a circuit that can be disposed in a terminal device. The user equipment may correspond to the terminal in the foregoing method.

The device may include a processor 910 and a memory 920. The memory 920 is configured to store an instruction, and the processor 910 is configured to execute the instruction stored in the memory 920, so as to implement the operations or implementations in the method corresponding to FIG. 3.

Further, the device may include an input port 940 and an output port 950. Further, the device may include a bus system 930. The processor 910, the memory 920, the input port 940, and the output port 950 may be connected to each other by using the bus system 930.

The processor 910 is configured to execute the instruction stored in the memory 920, to control the input port 940 to receive a signal and control the output port 950 to send a signal, to complete the operations performed by the terminal device in the foregoing method. The input port 940 and the output port 950 may be a same physical entity or different physical entities. When being the same physical entity, the input port 940 and the output port 950 may be collectively referred to as a transceiver. The memory 920 may be integrated into the processor 910, or may be separated from the processor 910.

In a possible implementation, it may be considered that functions of the input port 940 and the output port 950 are implemented by using a transceiver circuit or a dedicated transceiver chip, and the processor 910 is implemented by using a dedicated processing chip, a processing circuit, a processor, or a general purpose chip.

In another implementation, it may be considered that the terminal device provided in this embodiment of the present disclosure is implemented by using a general-purpose computer. In other words, program code for implementing functions of the processor 910, the input port 940, and the output port 950 is stored in the memory, and a general purpose processor executes the code in the memory to implement the functions of the processor 910, the input port 940, and the output port 950.

For concepts, explanations, detailed descriptions, and other operations related to the technical solutions provided in embodiments of the present disclosure and related to the device, refer to descriptions of the content in the foregoing methods or another embodiment. Details are not described herein again.

Figure 10:
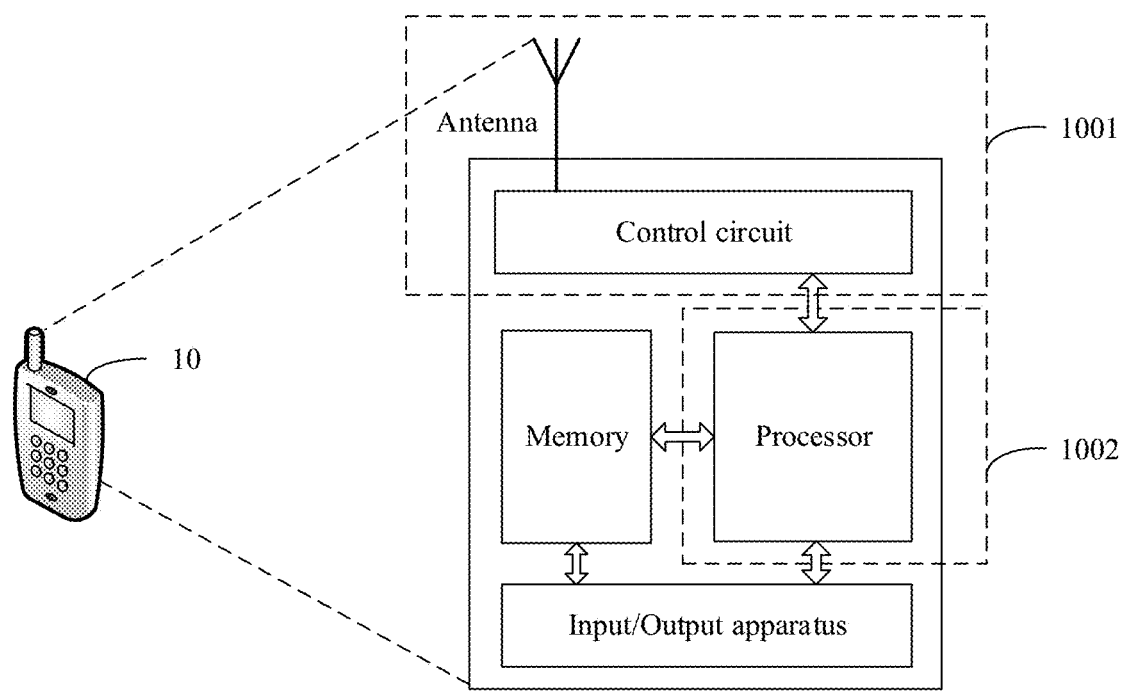
FIG. 10 is a schematic structural diagram of a terminal device according to an embodiment of the present disclosure.

FIG. 10 is a schematic structural diagram of user equipment according to the present disclosure. The user equipment may be applied to the foregoing data transmission system. For ease of description, FIG. 10 shows only main components of the user equipment. As shown in FIG. 10, the user equipment includes a processor, a memory, a control circuit, an antenna, and an input/output apparatus. The processor is mainly configured to: process a communication protocol and communication data; control an entire terminal device; execute a software program; and process data of the software program. For example, the processor is configured to support the terminal device in performing an action described in the embodiment of the foregoing data transmission method. The memory is mainly configured to store a software program and data, for example, store the foregoing precoding indicator information. The control circuit is mainly configured to perform conversion between a baseband signal and a radio frequency signal, and process the radio frequency signal. The control circuit and the antenna may also be collectively referred to as a transceiver that is mainly configured to receive and send a radio frequency signal in an electromagnetic wave form. The input/output apparatus such as a touchscreen, a display, or a keyboard is mainly configured to receive data entered by a user, and output data to the user.

After the user equipment starts, the processor may read a software program in a storage unit, explain and execute an instruction of the software program, and process data of the software program. When data needs to be sent in a wireless manner, the processor performs baseband processing on the to-be-sent data, and outputs a baseband signal to a radio frequency circuit. After performing radio frequency processing on the baseband signal, the radio frequency circuit sends a radio frequency signal outward in an electromagnetic wave form by using the antenna. When data is sent to the terminal device, the radio frequency circuit receives the radio frequency signal by using the antenna, converts the radio frequency signal into a baseband signal, and outputs the baseband signal to the processor; and the processor converts the baseband signal into data and processes the data.

A person skilled in the art may understand that, for ease of description, FIG. 10 shows only one memory and only one processor. In actual user equipment, there may be a plurality of processors and a plurality of memories. The memory may also be referred to as a storage medium, a storage device, or the like. This is not limited in this embodiment of the present disclosure.

In one embodiment, the processor may include a baseband processor and a central processing unit. The baseband processor is mainly configured to process the communication protocol and the communication data, and the central processing unit is mainly configured to: control the entire terminal device; execute the software program; and process the data of the software program. The processor in FIG. 10 integrates functions of the baseband processor and the central processing unit. A person skilled in the art may understand that the baseband processor and the central processing unit may be alternatively processors independent of each other, and are connected to each other by using a technology such as a bus. A person skilled in the art may understand that the user equipment may include a plurality of baseband processors to adapt to different network standards, and the user equipment may include a plurality of central processing units to enhance a processing capability of the user equipment. Components of the user equipment may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program. The processor executes the software program to implement a baseband processing function.

For example, in this embodiment of the present disclosure, the antenna and the control circuit that have a transceiver function may be considered as a transceiver unit 1001 of the user equipment, and the processor that has a processing function is considered as a processing unit 1002 of the user equipment. As shown in FIG. 10, the user equipment includes the transceiver unit 1001 and the processing unit 1002. The transceiver unit may also be referred to as a transceiver, a transceiver apparatus, or the like. In one embodiment, a component that is configured to implement a receiving function in the transceiver unit 1001 may be considered as a receiving unit, and a component that is configured to implement a sending function in the transceiver unit 1001 may be considered as a sending unit. In other words, the transceiver unit 1001 includes the receiving unit and the sending unit. For example, the receiving unit may also be referred to as a receiver, an input port, or a receiver circuit, and the sending unit may be referred to as a transmitter, a transmitter, or a transmitter circuit.

Figure 11:
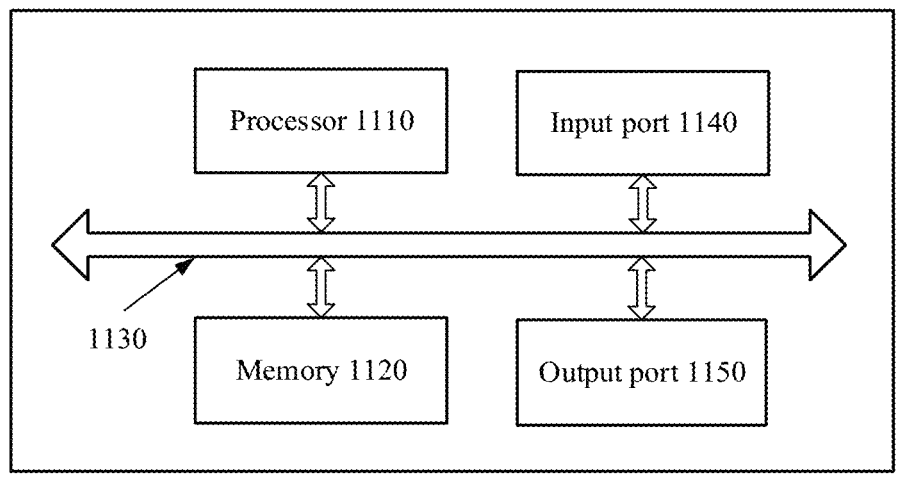
FIG. 11 is a schematic structural diagram of another device according to an embodiment of the present disclosure.

According to the foregoing method, FIG. 11 is a schematic structural diagram of another device according to an embodiment of the present disclosure. As shown in FIG. 11, the device may be a network device, or may be a chip or a circuit, for example, a chip or a circuit that can be disposed in the network device. The network device corresponds to the network device in the foregoing method. The device may include a processor 1110 and a memory 1120. The memory 1120 is configured to store an instruction, and the processor 1110 is configured to execute the instruction stored in the memory 1120, so that the device implements the operations or implementations in the method corresponding to FIG. 6.

Further, the network device may include an input port 1140 and an output port 1150. Still further, the network may include a bus system 1130.

The processor 1110, the memory 1120, the input port 1140, and the output port 1150 are connected to each other by using the bus system 1130. The processor 1110 is configured to execute the instruction stored in the memory 1120, to control the input port 1140 to receive a signal and control the output port 1150 to send a signal, to complete the operations performed by the network device in the foregoing method. The input port 1140 and the output port 1150 may be a same physical entity or different physical entities. When being the same physical entity, the input port 1140 and the output port 1150 may be collectively referred to as an input/output port. The memory 1120 may be integrated into the processor 1110, or may be separated from the processor 1110.

In an implementation, it may be considered that functions of the input port 1140 and the output port 1150 are implemented by using a transceiver circuit or a dedicated transceiver chip, and the processor 1110 is implemented by using a dedicated processing chip, a processing circuit, a processor, or a general purpose chip.

In another implementation, it may be considered that the network device provided in this embodiment of the present disclosure is implemented by using a general-purpose computer. In other words, program code for implementing functions of the processor 1110, the input port 1140, and the output port 1150 is stored in the memory, and a general purpose processor executes the code in the memory to implement the functions of the processor 1110, the input port 1140, and the output port 1150.

For concepts, explanations, detailed descriptions, and other operations related to the technical solutions provided in embodiments of the present disclosure and related to the device, refer to descriptions of the content in the foregoing methods or another embodiment. Details are not described herein again.

Figure 12:
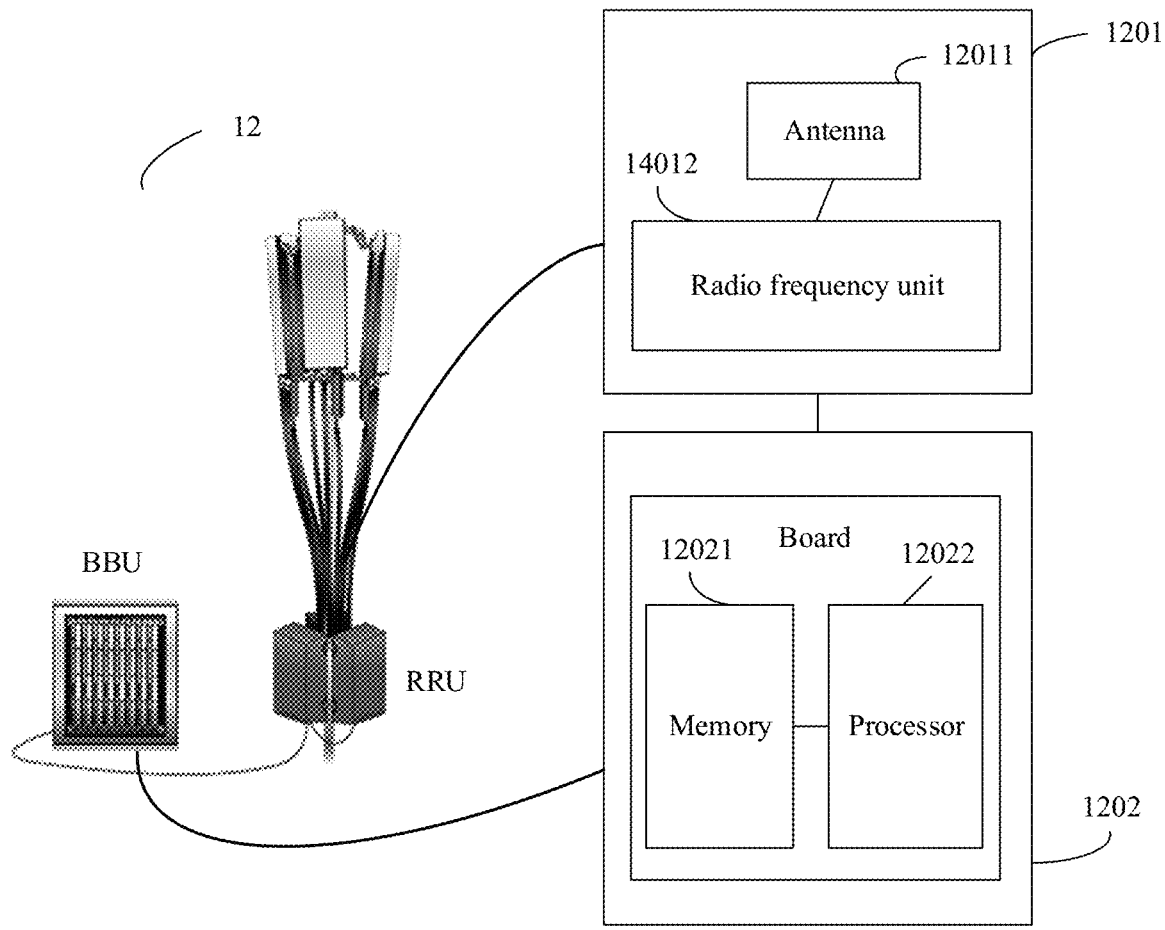
FIG. 12 is a schematic structural diagram of a network device according to an embodiment of the present disclosure.

According to the foregoing method, FIG. 12 is a schematic structural diagram of a network device according to an embodiment of the present disclosure, for example, may be a schematic structural diagram of a base station. As shown in FIG. 12, the network device may be applied to the foregoing data transmission system. The network device includes one or more radio frequency units, such as a remote radio unit (RRU) 1201 and one or more baseband units (BBU) (which may also be referred to as a digital unit (DU)) 1202. The RRU 1201 may be referred to as a transceiver unit, a transceiver, a transceiver circuit, or the like, and may include at least one antenna 12011 and a radio frequency unit 12012. The RRU 1201 is mainly configured to send and receive a radio frequency signal, and perform conversion between a radio frequency signal and a baseband signal. For example, the RRU 1201 is configured to send the signaling message in the foregoing embodiment to a terminal device. The BBU 1202 is mainly configured to perform baseband processing, control the base station, and the like. The RRU 1201 and the BBU 1202 may be physically disposed together, or may be physically separated, in other words, may be distributed base stations.

The BBU 1202 is a control center of the base station, may also be referred to as a processing unit, and is mainly configured to implement a baseband processing function, for example, channel coding, multiplexing, modulation, and spreading. For example, the BBU (the processing unit) may be configured to control the base station to perform the operation procedure related to the network device in the foregoing method embodiment.

In an example, the BBU 1202 may include one or more boards, and a plurality of boards may jointly support a radio access network (such as an LTE network) of a single access standard, or may separately support radio access networks of different access standards. The BBU 1202 further includes a memory 12021 and a processor 12022. The memory 12021 is configured to store suitable instructions and data. For example, the memory 12021 stores the precoding indicator information and the like in the foregoing embodiments. The processor 12022 is configured to control the base station to perform a suitable action, for example, is configured to control the base station to perform an operation procedure related to the network device in the foregoing method embodiment. The memory 12021 and the processor 12022 may serve one or more boards. In other words, the memory and the processor may be separately disposed on each board. Alternatively, the plurality of boards may share a same memory and processor. In addition, each board may further be provided with a suitable circuit.

According to the methods provided in the embodiments of the present disclosure, an embodiment of the present disclosure further provides a communications system. The communications system includes the foregoing network device and one or more terminals.

It should be understood that, in the embodiments of the present disclosure, the processor may be a central processing unit (CPU), or the processor may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor, or the like.

The memory may include a read-only memory and a random access memory, and provide the processor with an instruction and data. A part of the memory may further include a nonvolatile random access memory.

In addition to a data bus, the bus system may further include a power bus, a control bus, a status signal bus, and the like. However, for clear description, various buses in the figures are marked as the bus system.

In an implementation process, the operations in the foregoing methods may be completed by using an integrated logic circuit of hardware in the processor, or by using an instruction in a form of software. The operations in the methods disclosed with reference to the embodiments of the present disclosure may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory. The processor reads information from the memory and completes the operations in the foregoing methods in combination with hardware of the processor. To avoid repetition, details are not described herein again.

It should be further understood that numbers such as "first", "second", "third", and "fourth" included in this specification are merely for distinguishing purposes for ease of description, and are not intended to limit the scope of the embodiments of the present disclosure.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, in various embodiments of the present disclosure, sequence numbers of the foregoing processes do not mean execution sequences. The execution sequences of the processes should be determined based on functions and internal logic of the processes, and should not be construed as any limitation on the implementation processes of the embodiments of the present disclosure.

A person of ordinary skill in the art may be aware that, in combination with illustrative logical blocks described in the embodiments disclosed in this specification and operations can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present disclosure.

It can be clearly understood by a person skilled in the art that, for the purpose of convenient and brief description, for a detailed working processes of the system, apparatus, and unit, refer to a corresponding process in the foregoing method embodiments. Details are not described herein again.

In the several embodiments provided in the present disclosure, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, in other words, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or the units may exist alone physically, or two or more units may be integrated into one unit.

All or some of the foregoing embodiments may be implemented by using software, hardware, firmware, or any combination thereof. When the software is used to implement the embodiments, all or some of the foregoing embodiments may be implemented in a form of a computer program product. The computer program product includes one or more computer instructions. When the computer program instructions are loaded and executed on a computer, the procedures or functions according to the embodiments of the present disclosure are all or partially generated. The computer may be a general-purpose computer, a special-purpose computer, a computer network, or another programmable apparatus. The computer instructions may be stored in a computer readable storage medium, or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a Solid State Disk (SSD)), or the like.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data transmission method, comprising:
receiving, by a terminal device, precoding indicator information, wherein the precoding indicator information comprises K first indicators and one second indicator;
determining, by the terminal device, K first precoding matrices based on the K first indicators, and determining a second precoding matrix based on the second indicator, wherein K is a positive integer;
precoding, by the terminal device by using the K first precoding matrices, data to be sent in K first frequency bands, to obtain precoded first data, and precoding, by using the second precoding matrix, data to be sent in a second frequency band, to obtain precoded second data, wherein the K first frequency bands are located in a physical uplink shared channel (PUSCH) scheduling frequency band; wherein the second frequency band is a frequency band in the PUSCH scheduling frequency band other than the K first frequency bands; and
sending, by the terminal device, the precoded first data in the K first frequency bands, and sending the precoded second data in the second frequency band.

2. The method according to claim 1, wherein each of the K first indicators comprises M reference signal resource indicators, and M is a positive integer; and
wherein the determining, by the terminal device, of the K first precoding matrices based on the K first indicators comprises:
for the M reference signal resource indicators comprised in each first indicator, determining, by the terminal device, M reference signal resources indicated by the M reference signal resource indicators, and determining one first precoding matrix based on the M reference signal resources, wherein
the M reference signal resources are in N reference signal resources sent before the terminal device receives the precoding indicator information, and N is a positive integer greater than or equal to M.

3. The method according to claim 1, wherein each of the K first indicators comprises one precoding matrix indicator; and
wherein the determining, by the terminal device, of the K first precoding matrices based on the K first indicators comprises:
for the precoding matrix indicator comprised in each first indicator, determining, by the terminal device, one first precoding matrix based on a correspondence between the precoding matrix indicator and the first precoding matrix.

4. The method according to claim 1, wherein the second indicator comprises M reference signal resource indicators; and
the determining, by the terminal device, of the second precoding matrix based on the second indicator comprises:
determining, by the terminal device, M reference signal resources indicated by the M reference signal resource indicators; and
determining, by the terminal device, the second precoding matrix based on the M reference signal resources, wherein
the M reference signal resources are in N reference signal resources sent before the terminal device receives the precoding indicator information, and N is a positive integer greater than or equal to M.

5. The method according to claim 1, wherein the second indicator is one precoding matrix indicator, and the determining, by the terminal device, of the second precoding matrix based on the second indicator comprises:

determining, by the terminal device, the second precoding matrix based on a correspondence between the precoding matrix indicator and the second precoding matrix.

6. The method according to claim 1, wherein the precoding indicator information further comprises position indication information of the K first frequency bands, and the terminal device determines positions of the K first frequency bands in the PUSCH scheduling frequency band based on the position indication information.

7. The method according to claim 6, wherein the positions of the K first frequency bands in the PUSCH scheduling frequency band comprise K contiguous frequency bands starting from a lowest frequency position in the PUSCH scheduling frequency band, or starting from a highest frequency position in the PUSCH scheduling frequency band.

8. The method according to claim 1, wherein a bandwidth occupied by each of the K first frequency bands is less than a bandwidth occupied by the second frequency band.

9. A data transmission method, comprising:
sending, by a network device, precoding indicator information, wherein the precoding indicator information comprises K first indicators and one second indicator, the K first indicators indicate K first precoding matrices, K is a positive integer, and the second indicator indicates a second precoding matrix; and
receiving, by the network device, first data obtained after precoding is performed on K first frequency bands, and receiving second data obtained after precoding is performed on a second frequency band, wherein
the first data uses the K first precoding matrices, and the second data uses the second precoding matrix;
the K first frequency bands are located in a physical uplink shared channel (PUSCH) scheduling frequency band; and
the second frequency band is a frequency band in the PUSCH scheduling frequency band other than the K first frequency bands.

10. The method according to claim 9, wherein each of the K first indicators comprises M reference signal resource indicators, M is a positive integer, and the M reference signal resource indicators comprised in each first indicator are used to indicate M reference signal resources; and
the M reference signal resources are in N reference signal resources sent before the network device sends the precoding indicator information, and N is a positive integer greater than or equal to M.

11. The method according to claim 9, wherein each of the K first indicators comprises one precoding matrix indicator, which indicate indicates one first precoding matrix.

12. The method according to claim 9, wherein the second indicator comprises M reference signal resource indicators, and the M reference signal resource indicators comprised in the second indicator are used to indicate M reference signal resources; and
the M reference signal resources are in N reference signal resources sent before the network device sends the precoding indicator information, and N is a positive integer greater than or equal to M.

13. The method according to claim 9, wherein the second indicator is one precoding matrix indicator, which indicates the second precoding matrix.

14. The method according to claim 9, wherein the precoding indicator information further comprises position indication information of the K first frequency bands, and the position indication information is used to indicate positions of the K first frequency bands in the PUSCH scheduling frequency band.

15. The method according to claim 14, wherein the positions of the K first frequency bands in the PUSCH scheduling frequency band are K contiguous frequency bands starting from a lowest frequency position in the PUSCH scheduling frequency band, or starting from a highest frequency position in the PUSCH scheduling frequency band.

16. The method according to claim 9, wherein a bandwidth occupied by each of the K first frequency bands is less than a bandwidth occupied by the second frequency band.

17. A terminal device, comprising:
at least one processor; and
a memory coupled to the at least one processor and storing program instructions, which, when executed by the at least one processor, cause the at least one processor to perform operations comprising:
receiving precoding indicator information, wherein the precoding indicator information comprises K first indicators and one second indicator;
determining K first precoding matrices based on the K first indicators, and determining a second precoding matrix based on the second indicator, wherein K is a positive integer;
precoding, by using the K first precoding matrices, data sent in K first frequency bands, to obtain precoded first data, and precoding, by using the second precoding matrix, data sent in a second frequency band, to obtain precoded second data, wherein
the K first frequency bands are located in a physical uplink shared channel (PUSCH) scheduling frequency band; and
the second frequency band is a frequency band in the PUSCH scheduling frequency band other than the K first frequency bands; and
sending, the precoded first data in the K first frequency bands, and sending the precoded second data in the second frequency band.

18. The terminal device according to claim 17, wherein each of the K first indicators comprises M reference signal resource indicators, and M is a positive integer; and
the determining K first precoding matrices based on the K first indicators comprises:
for the M reference signal resource indicators comprised in each first indicator, determining M reference signal resources indicated by the M reference signal resource indicators, and determining one first precoding matrix based on the M reference signal resources, wherein the M reference signal resources are in N reference signal resources sent before receiving the precoding indicator information, and N is a positive integer greater than or equal to M.

19. The terminal device according to claim 17, wherein each of the K first indicators comprises one precoding matrix indicator; and
wherein the determining K first precoding matrices based on the K first indicators comprises:
for the precoding matrix indicator comprised in each first indicator, determining, one first precoding matrix based on a correspondence between the precoding matrix indicator and the first precoding matrix.

20. The terminal device according to claim 17, wherein the second indicator comprises M reference signal resource indicators; and
the determining of the second precoding matrix based on the second indicator comprises:
determining M reference signal resources indicated by the M reference signal resource indicators; and determining the second precoding matrix based on the M reference signal resources, wherein the M reference signal resources are in N reference signal resources sent before the terminal device receives the precoding indicator information, and N is a positive integer greater than or equal to M.

* * * * *